Aug. 10, 1965   C. L. BROWN   3,199,298
POWER BRAKE MECHANISM
Filed Oct. 9, 1962
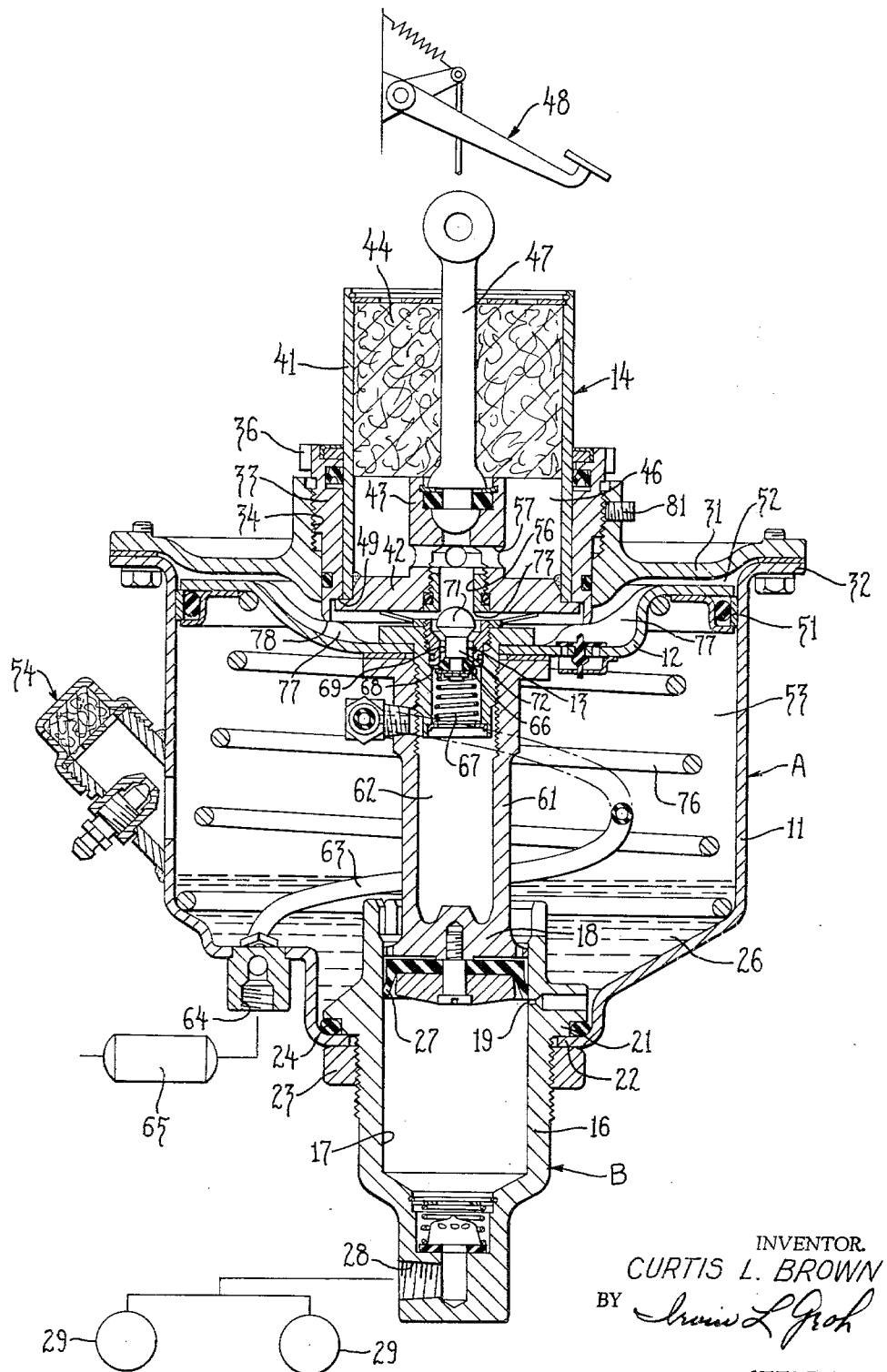
INVENTOR.
CURTIS L. BROWN
BY *Irwin L. Groh*
ATTORNEY.

United States Patent Office 3,199,298
Patented Aug. 10, 1965

3,199,298
POWER BRAKE MECHANISM
Curtis L. Brown, Owosso, Mich., assignor to Midland-Ross Corporation, Cleveland, Ohio, a corporation of Ohio
Filed Oct. 9, 1962, Ser. No. 229,419
5 Claims. (Cl. 60—54.6)

This invention relates to fluid pressure actuating devices and, more particularly, to such devices for actuating the hydraulic brake system on a vehicle.

Pressure devices of this type are frequently referred to as power brakes and rely on a pressure differential acting on a piston or the like which moves the piston of a compensating master cylinder to apply brakes. It is common to mount the master cylinder on the power unit with the two pistons connected to move as a unit. In spite of such unitary movement, each piston has its own critical relationships and positions which must be maintained if the power brakes are to function properly and efficiently. For example, in the released position of the brakes, the hydraulic piston must be located closely adjacent one side of the conventional compensating port which usually is located in the cylinder wall of the master cylinder. In a released position of the brakes, the compensating port communicates with an hydraulic reservoir at atmospheric pressure to insure full release of the brakes and a complete supply of hydraulic fluid in the master cylinder. The hydraulic piston must completely expose the port and yet must not be spaced from the port so that initial brake applying movement of the piston immediately covers the port to permit displacement of hydraulic fluid to the brakes.

The initial position of the power piston also is critical. The valve mechanism which controls pressure differential is carried by the piston and is actuated by manual movement of a member which normally is connected to the foot pedal. In a brake released position, the critical relation of the valve mechanism and the pedal controlled member which moves it is determined by the position of the power piston.

To maintain the two critical positions, the obvious method of adjustment is to position the two pistons independently of each other and then connect them together. This can be done only before the power brake is completely assembled. Consequently, the required adjustment must be accomplished during the manufacturing process or when repair is necessary, the unit must be dismounted from the vehicle and disassembled. Because of the difficulty of adjustment, it is sometimes completely ignored in the design of a unit and an attempt is made to minimize its need by maintaining very close and costly tolerances.

It is a general object of the invention to provide a power brake unit in which critical relationships of both the power unit and the hydraulic master cylinder to the associated parts may be maintained by easy adjustment.

It is a further object to provide a power brake unit in which such adjustments may be made externally of the unit when it is completely assembled either during the manufacturing process or, thereafter, with the unit mounted on the vehicle.

These and other objects and advantages will become apparent from the following description and the drawings disclosing a preferred embodiment of the invention.

The drawing is a cross-sectional view of a power brake unit embodying the present invention with some of the associated mechanism illustrated schematically.

Power brake mechanisms, which include a power unit A and a hydraulic master cylinder unit B, take many forms. However, all have the same essential components. In the preferred embodiment of the invention, the power unit A is made up of a fluid pressure tight housing 11, a pressure responsive unit such as a piston 12 movable in the housing and a so-called follow-up valve mechanism 13 carried by the piston and movable by a control member 14 to cause a pressure differential that moves the piston 12. The master cylinder unit B has a body 16 forming a cylinder 17 and is mounted to the housing 11. A piston 18 connected to the power piston 12 is movable in the cylinder 17 in response to movement of the power piston to displace fluid through an outlet 19 to the conventional hydraulic brakes on a vehicle. A compensating port 19 is formed in the wall of the cylinder to communicate with a source of hydraulic fluid and is adapted to be closed upon movement of the hydraulic piston in a brake applying direction.

In the illustrated embodiment of the invention, the power brake mechanism is of the vertical type but it will be seen from the description that the invention is equally applicable to horizontally disposed mechanisms.

More specifically, the master cylinder body 16 is rigidly mounted to housing 11 by means of a collar 21 which engages one side of a flange 22 on the housing 11 and is held in position by a nut 23 threaded on the exterior of the master cylinder body 16 to engage the other side of the flange 22. A seal 24 is provided between the collar 21 and flange 22 to insure a fluid tight connection. The hydraulic cylinder 17 communicates through the small compensating port 19 with a reservoir 26 of hydraulic fluid formed by the lower portion of the housing 11 above the master cylinder 17. The hydraulic piston 18 has a conventional cup seal 27 and is reciprocable in the cylinder 17. In the fully retracted position of the piston 18 as illustrated in the drawing, the cylinder 17 is in communication with the reservoir 26 to insure a full supply of hydraulic fluid in the cylinder. Upon downward movement of the piston 18, the seal 27 first covers the small compensating port 19 and subsequent movement is effective to displace hydraulic fluid from the outlet 28 to the conventional hydraulic brakes on a vehicle which are indicated schematically at 29.

The power unit A includes the housing 11 which is closed at its lower end by the hydraulic unit B. The upper end of the housing is provided with a cover 31 fastened in sealed relation to a flange 32 of the housing 11. A cylindrical sleeve 33 is threaded into a large opening 34 in the cover 31 and may be rotated by means of lugs 36 to select the axial position of the sleeve 33 relative to the cover 31.

The sleeve 33 acts as a support for the manual control unit 14 which comprises a cylindrical piston 41 closed at its lower end by a rigidly attached piston head 42 having a stem 43. An air filter 44 is connected at the upper end of the piston 41 to permit the free passage of air from the atmosphere to a chamber 46 in the interior of the piston 41. A manual movable push rod 47 passes through the center of the filter 44 and has a lower end connected to the stem 43, the upper end of the push rod 47 is adapted for connection to brake pedal linkage 48 which is illustrated schematically. Movement of the pedal linkage 48 and, consequently, the push rod 47 results in downward sliding movement of the manual control member 14 from its initial position in the sleeve 33, in which the piston head 42 is in engagement with a shoulder 49 formed at the lower end of the sleeve 33 to limit upward movement of the control member 14.

The power piston 12 forms a movable wall which is supported for sliding movement in the housing 11 and is provided with a seal assembly 51 at its outer periphery to engage the internal wall of the housing 11 so that separate fluid pressure chambers 52 and 53 are formed in the housing above and below the piston 12, respectively.

The chamber 53 is in constant communication with the atmosphere through a breather assembly 54 and chamber 52 is adapted to communicate with the atmosphere in chamber 46 in the interior of the manually movable control member 14 through an axial passage 56 and radial passages 57 formed in the piston head 42 and stem 43.

The power piston 12 is provided with a generally tubular piston rod 61, the lower end of which is closed to form the piston head 18 in the hydraulic cylinder 17. The interior of the piston rod 61 forms a fluid supply chamber 62 which communicates through a flexible hose 63 with a port 64. The port 64 is in continuous communication with a supply of fluid pressure such as compressed air in a reservoir 65.

The follow up valve mechanism 13 comprises a supply valve element 66 which is normally urged upwardly by a spring 67 into engagement with a supply valve seat 68 formed by the shoulder of a bore 69 which communicates with the chamber 52. In its normally closed position, the supply valve element 66 isolates the supply chamber 62 from the fluid pressure chamber 52.

An exhaust valve element 71 is connected to the supply valve element 66 by a stem 72 so that both valve elements move as a unit. The exhaust valve element 71 is adapted to engage an exhaust valve seat 73 formed at the entrance to the passage 56. In its initial position, the exhaust valve element 71 is spaced slightly from its seat 73 as shown in FIGURE 1 to permit passage of atmosphere air from the chamber 46 to the chamber 52 by way of the passages 56 and 57.

In the absence of differential pressure, the piston 11 is biased to its uppermost position by return spring 76 so that radial flanges 77 formed by the piston contact a stop portion 78 formed by the lower end of the sleeve 33. This is the brake released position in which opposite sides of the piston member 12 are exposed to equal pressure because chambers 52 and 53 communicate with the atmosphere. The supply of fluid under pressure in supply chamber 62 is isolated from chamber 52 by the supply valve element 66 closed against its seat 68. Under these conditions, the power piston 12 is stationary and no force is being applied to the hydraulic fluid in the master cylinder 13 so that the vehicle brakes 29 remain released to permit movement of the vehicle.

To actuate the power brake unit to apply the brakes, manual effort from the pedal mechanism 48 is transmitted through the push rod 47 to move the control member 14 downwardly relative to the sleeve 33. Initial movement causes the exhaust valve seat 73 to move downwardly and engage the exhaust valve element 71 without disturbing the position of the supply valve element 66 closed on seat 68. This isolates the fluid pressure chamber 52 from the atmosphere in the chamber 46 of the control member 14. The follow-up valve mechanism is now in its lap position in which the various chambers 46, 52, 53 and 62 are isolated from each other. Subsequent downward movement of the push rod 47 is transmitted to the valve mechanism 13 but not to the power piston 12 and is effective to actuate the valve mechanism. When such movement occurs, the exhaust valve element 71 is moved downwardly relative to the stationary piston 12 and moves the supply valve element 66 from its seat 68 to permit fluid under pressure from the chamber 62 to pass through the bore 69 into the chamber 52 above the piston 12. Since atmospheric pressure exists below the piston 12, the resulting pressure differential causes downward movement of the piston 12 and the rod 61 which results in displacement of hydraulic fluid from the master cylinder 13 to the brakes 29.

For proper operation of the brakes, the cup seal 27 must be positioned as close as possible to the compensating port 19 without obstructing fluid communication between the cylinder 17 and the reservoir 26. At the same time, it is necessary for the power piston 14 to be in its fully retracted position and for the exhaust valve element 71 to be spaced from its seat 73. The positions illustrated in the drawing illustrate the desired relative position of the parts.

The desired retracted position can be selected after the power brake mechansim is completely assembled and also after it has been installed on a vehicle. This is accomplished mechanically without the use of fluid pressure by rotating the sleeve 14 so that it moves downwardly. Such movement will cause corresponding downward movement of the piston means which includes the piston 12 and piston 18 so that the cup seal 27 closes the compensating port 19 and displaces fluid from the cylinder 17 to the brakes. Such displacement of fluid is resisted as the brakes are applied and results in large increase in pressure in the cylinder 17. The increased pressure increases the force required to rotate the sleeve 33 so that the resistance can be sensed. Thereafter, the sleeve 33 may be slowly rotated in the opposite direction to cause axially upward movement. The pressure in cylinder 17 will force the piston 18 upwardly to maintain piston 12 in engagement with the stop portion 78 on sleeve 33 until the compensating port 19 is exposed. At that time, the hydraulic fluid under relative high pressure in the cylinder 17 will be free to flow to the reservoir 26 which is at atmospheric pressure. This release in pressure is easily sensed by the reduction in force required to rotate the sleeve 41. Further rotation of the sleeve 33, is stopped and a radial stud 81 in the cover 31 may be tightened to engage the sleeve 41 and prevent rotational movement from its adjusted position.

It will be noted that for all axial positions of the sleeve 33 the spacing of the control member 14 from the piston 12 and the spacing of the exhaust seat 73 from the exhaust valve 71 remains the same. Since these critical relationships are maintained during axial adjustment of the sleeve 33, it is possible to select the desired retracted position of the hydraulic piston 18 relative to the compensating port 19.

A power brake unit has been disclosed in which it is possible to accurately and easily select the proper retracted position of the hydraulic piston without changing the relationship of the manual actuator, valve mechanism and power piston and in which such adjustment may be made from the exterior of the unit.

It should be understood that it is not intended to limit the invention to the described forms and details and that the invention includes other forms and modifications within the scope of the appended claims.

What is claimed is:

1. In a power brake mechanism, a housing, piston means movably supported in said housing and forming a liquid chamber at one side and a power chamber at the other side, said piston means being movable from a retracted position in response to an increase in pressure in said power chamber to displace liquid from said liquid chamber, valve means movable to vary the pressure in said power chamber and being supported by said piston means for movement relative thereto, a support member mounted in a wall of said housing for movement to selected positions axially of said piston means and being engageable with said piston means to determine said retracted position, a control member for moving said valve means slidably mounted in said support member for movement relative thereto axially of said piston means and normally being positioned in predetermined spaced relation to said valve means when said piston means is in said retracted position, stop means formed by said supported member and enagageable with said control member to limit movement relative to said support member away from said piston means, said support member being movable to a selected position of adjustment with said stop means in engagement with said control member and during enagagement with said piston means to determine said retracted position without changing the relative positions of said control member and said valve means.

2. In a power brake mechanism having a housing, piston means forming a liquid chamber at one side and a power chamber at the other side and supported for movement in said housing from a first position toward a second position in response to an increase in pressure in the power chamber to displace liquid from said liquid chamber, valve means carried by said piston means for movement relative thereto between first and second positions to vary the pressure in said power chamber, a support member mounted in said wall for adjustment axially of said valve means and said piston means and being in engagement with the latter when said piston means is in its first position, stop means formed by said support member, a control member for moving said valve means and being slidably supported in said support member for movement between a first position determined by engagement with said stop means and a second position determined by engagement with said piston means, said control member normally being spaced a predetermined distance from said valve means when said control member and piston means are in said first positions, said support member being adjustable axially to a selected fixed position determining said first position of said piston means while maintaining said predetermined spaced relation between said valve means and control means.

3. In a fluid pressure actuator, a housing, a support member mounted in said housing and having portions in said housing and exterior of said housing, said member being movable relative to said housing to selected positions, a control member slidably supported in said support member and having one end in said housing and the other end exterior of said housing, piston means supported in said housing for movement independently of said support member and having a retracted position in engagement with said portion of said support member in said housing, said piston means being movable between said retracted position and an operative position in response to a change in pressure differential acting at one side of said piston means, valve means carried by said piston means and being movable in response to movement of said control member to vary the pressure differential acting on said piston means, said control member having an initial position normally spaced a predetermined distance from said piston means and valve means, stop means formed by said support member and engaging said control member to limit movement of the latter away from said valve means, said support member being manually movable to selected positions of adjustment to determine said retracted position of said piston means without changing said predetermined distance between said control member and said piston and valve means.

4. In a brake mechanism comprising a cylinder, a fluid reservoir, passage means between said reservoir and said cylinder, a first piston in said cylinder having a retracted position immediately adjacent said passage means and being movable therefrom to close said passage means and force fluid from said cylinder, a motor for moving said first piston including a housing, a second piston movably supported in said housing and rigidly connected to said first piston for movement therewith from an initial position, valve means supported in said second piston for movement with said second piston and relative thereto from an initial position to control pressure differential acting on said second piston, control means for moving said valve means and being movable from an initial position spaced from said valve means, a sleeve movably supporting said control means and having a first stop portion associated with said sleeve to engage said control member to limit movement from its initial position, said sleeve having a second stop portion engaging said piston to limit movement from its initial position, said sleeve member being adjustable axially of said pistons when said second piston, said valve means and said control means all are in said initial positions to move said control member and said pistons to determine the retracted position of said first piston relative to said passage means without changing any of said initial positions.

5. In a brake mechanism comprising a hydraulic master cylinder having a piston movable from a normally retracted position to force hydraulic fluid from said cylinder to apply the brakes on a vehicle, and a source of hydraulic fluid communicating with said cylinder through a port in said cylinder at one side of said piston when the latter is in its retracted position, a motor including a housing connected to said cylinder, a movable wall in said housing rigidly connected to said piston for movement as a unit therewith in response to a change in pressure differential acting on said wall, valve means movably supported in said wall for controlling said pressure differential, control means for moving said valve means and normally being positioned in predetermined spaced relation to said valve means in the absence of pressure differential on said wall, a support member adjustably mounted in said housing and slidably supporting said control means, said support member presenting a first stop portion engageable with said control means and a second stop portion engageable with said wall to limit movement of the latter and said control means in one direction, said support member being movable in the opposite direction to a selected position when said control means and wall are in engagement with their respective stop portions to move said piston to a selected retracted position relative to said port without changing said predetermined spaced relation between said control means and valve means.

References Cited by the Examiner
UNITED STATES PATENTS

| | | | |
|---|---|---|---|
| 3,078,677 | 2/63 | Cripe | 60—546 |
| 3,082,744 | 3/63 | Gardner | 91—369 |

JULIUS E. WEST, *Primary Examiner.*

ROBERT R. BUNEVICH, *Examiner.*